June 26, 1945. N. C. PRICE 2,379,183
AUXILIARY STEAM PLANT FOR AIRCRAFT
Filed July 30, 1942  3 Sheets-Sheet 3
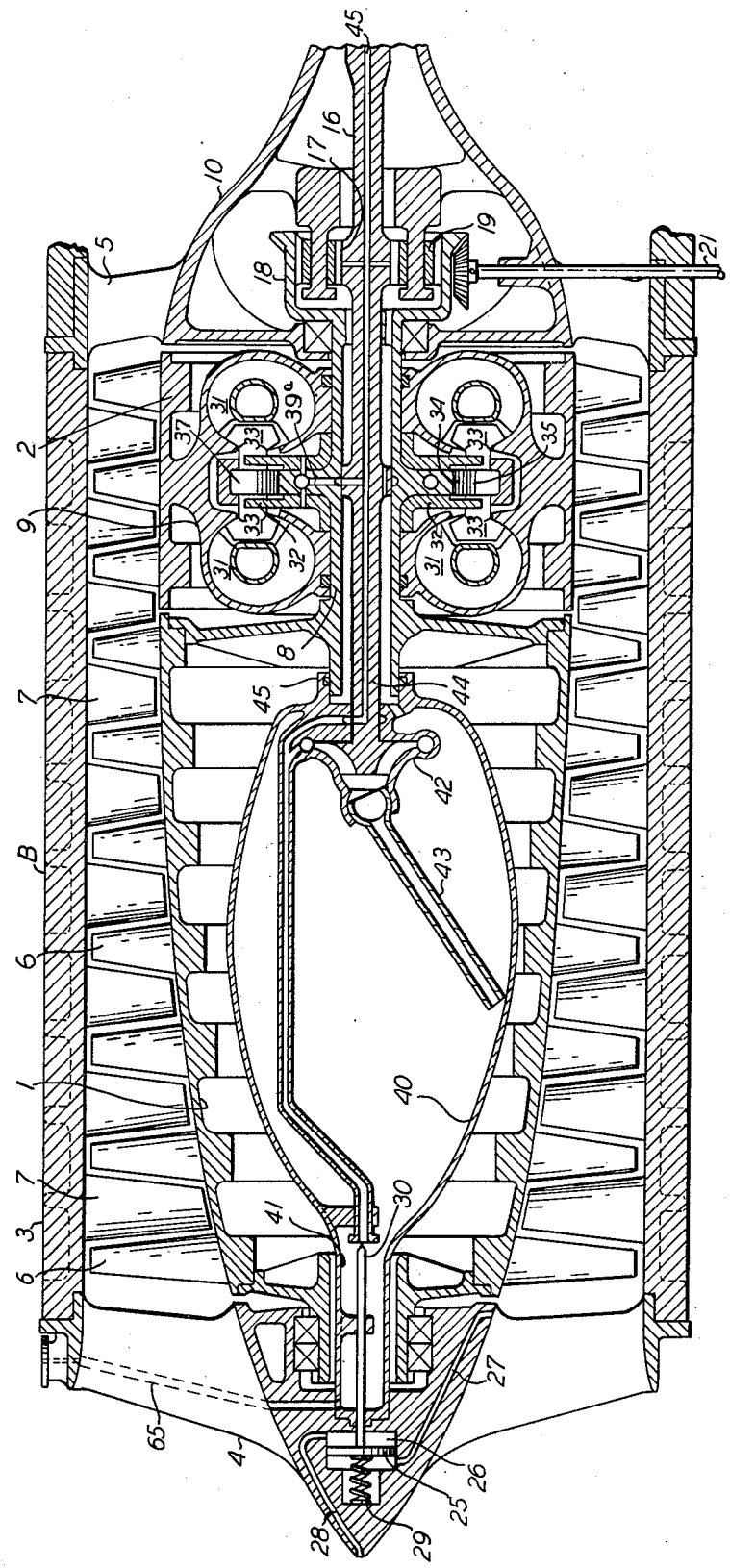
FIG-IV
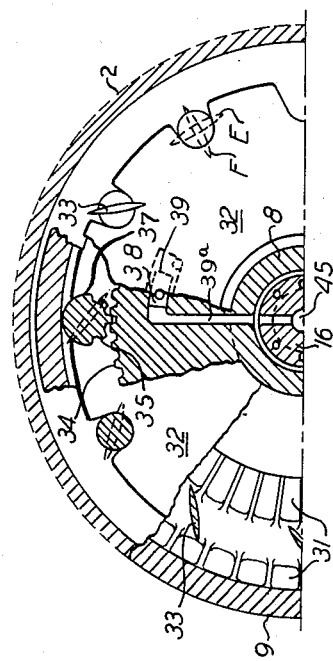
FIG-V
INVENTOR
NATHAN C. PRICE
BY George C. Sullivan Patented June 26, 1945

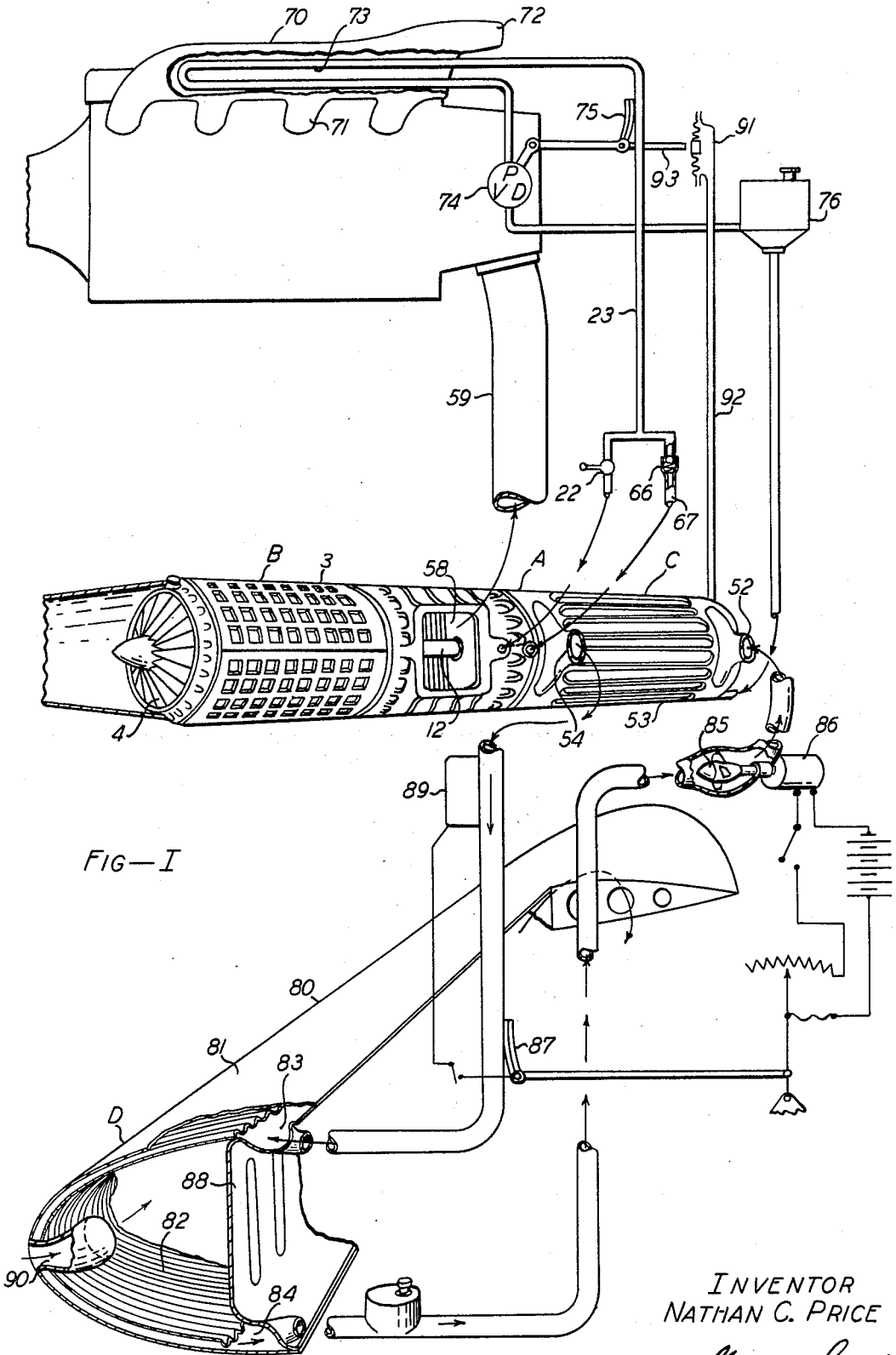

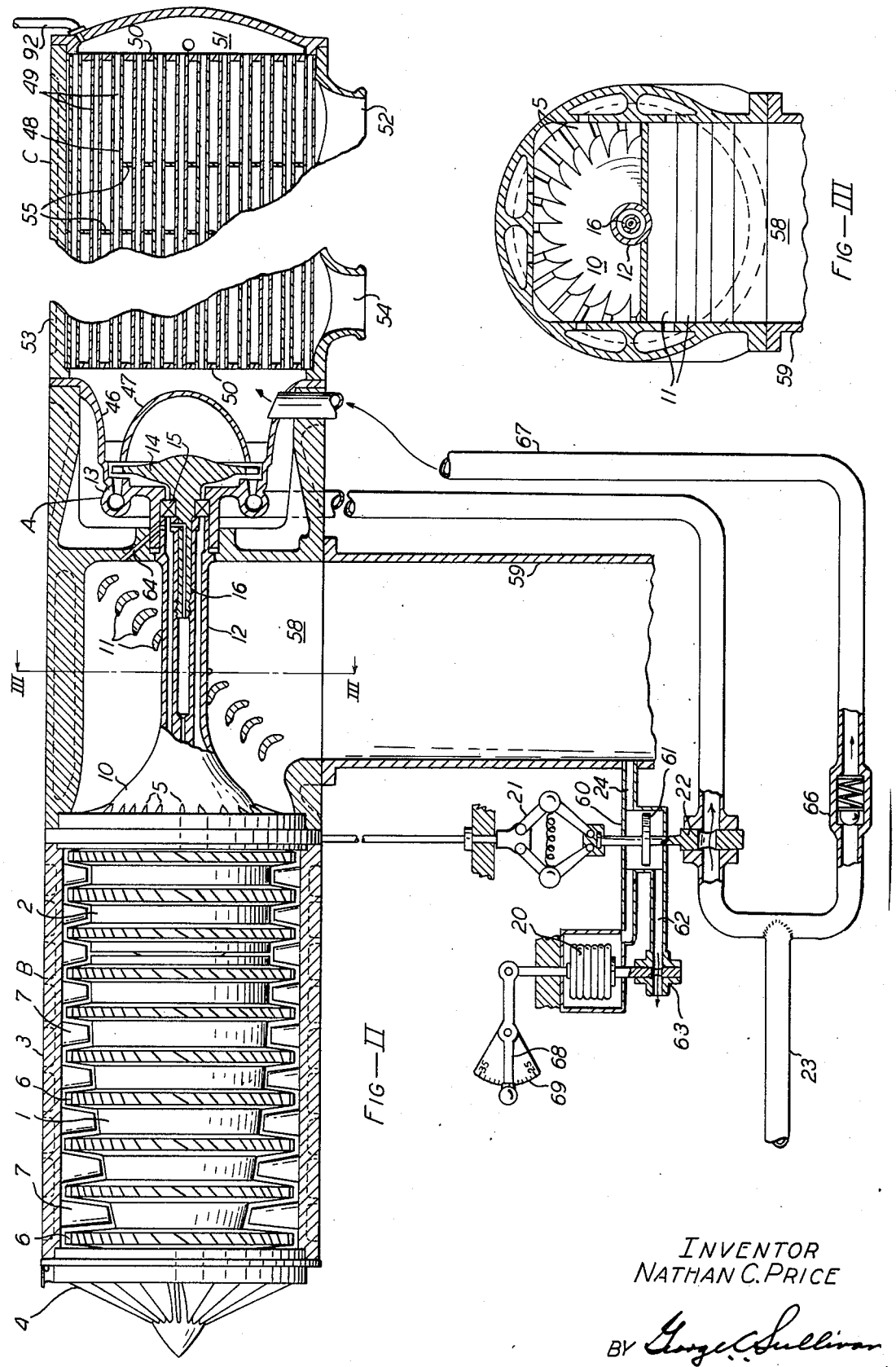

2,379,183

UNITED STATES PATENT OFFICE 2,379,183

AUXILIARY STEAM PLANT FOR AIRCRAFT

Nathan C. Price, Hollywood, Calif., assignor to Lockheed Aircraft Corporation, Burbank, Calif.

Application July 30, 1942, Serial No. 452,841

8 Claims. (Cl. 230—114)

This invention relates to new and improved methods of supercharging engines and deicing wings in high altitude aircraft. It provides simplified and improved automatic controls, and novel structure to accomplish the functions of engine supercharging and wing deicing. The invention also embraces a technique for improving the operational characteristics of superchargers of the change-of-velocity type at high altitudes.

In high altitude aircraft it has not been possible heretofore to provide a supercharger of good efficiency, which has a stable range broad enough to maintain the wide range of flow required at high supercharger compression ratios. Axial flow blowers in particular, which provide the highest peak efficiency and which, therefore, are most attractive basically, have an especially narrow stable range even with variable speed control provided, unless the number of stages is great.

An airplane operating at 30,000 ft. altitude for example, requires the development of full rated power at high manifold pressure during climb and in the event of failure of one of its engines. On the other hand, the supecharger is called upon to deliver approximately the same high compression under the conditions of lowest cruising power at best economical speed. Then the propeller is placed in highest pitch and the fuel mixture is leaned down as far as possible with the engine rotating at 40% of maximum speed.

As a result of the latter, it has been found necessary in new airplane designs for meeting varied power conditions at high altitude, to install two separate supercharger drives, and controls therefor, one of which superchargers can be stopped when the cruising power condition is established. This is costly from the standpoint of weight and complication. Furthermore, the pilot must manually manipulate the controls for changeover from double to single supercharger operation, or vice versa. Even if automatic controls accomplish this task the transaction is accompanied by an abrupt change of conditions which is bad from the control standpoint.

In the invention this above situation is avoided by providing means subject to new automatic control, for regulating the relative speed of separate section of the rotor of a single supercharger, in the case illustrated of the axial flow type. The particular mechanical embodiment of the invention therewith illustrated also includes other novel cooperative features in respect to the construction of a variable speed drive mechanism and lubrication system forming a part of the blower.

It is an object of this invention to provide a combined engine supercharging and wing deicing system for high altitude aircraft, which will greatly improve airplane range and which will absolutely prevent hazards of ice formation on wings and empennage.

It is also an object of this invention to provide a waste heat recovery system which will operate both supercharger and wing deicing provisions at high altitude, and which will continue to operate wing deicing provisions at low altitude when supercharger is not in use.

It is a further object of this invention to provide a method of condensing exhausted working vapor from a supercharger drive turbine without involving danger of some of the condensate freezing in local regions of the wing surface being deiced.

Still another object of this invention is to protect the vapor generation system against necessity to operate dry or at excessive temperature at any time.

It is also an object of this invention to extend the stable high efficiency range of turbo-superchargers over a wider range of air discharge quantity at high compression ratios to improve power plant economy, to reduce the required amount of intercooling, to avoid the use of dual separate blowers and drives therefor, and to avoid the necessity of using "step" controls.

A further object of this invention is to provide simple and effective automatic controls to appropriately regulate vapor generation, supercharger output, and wing deicing heat.

It is also an object of this invention to provide apparatus to accomplish the foregoing with a minimum amount of weight and with maximum dependability and compactness.

Other and further important objects of this invention will be apparent from the disclosures in the specification and the accompanying drawings.

This invention in its preferred form is illustrated in the drawings and hereinafter more fully described.

In the drawings—

Figure I is a schematic representation of the system for engine supercharging and wing deicing in high altitude aircraft.

Figure II is a section of the supercharging unit of the system, along the main axis thereof.

Figure III is a section through the supercharger outlet, on the line III—III of Figure II.

Figure IV is a section of the supercharging unit of the system showing internal controls in greater detail than in Figure II.

Figure V is a transverse section of the supercharging unit of the system at the region of a fluid coupling incorporated in the unit.

In Figure I an airplane engine exhaust manifold 70 provided with stub stacks 71 and a propulsive jet outlet 72 houses a boiler 73 for generation of working vapor steam for instance by exhaust heat. The boiler 73 is supplied feedwater preferably at about 2,300 pounds per square inch pressure from a variable discharge pump 74 regulated by a thermostat 75 at the steam supply line 23 extending to a steam turbine A driving a supercharging unit generically indicated at B. The setting of the thermostat may be 850° F. for example. Thus if the steam temperature exceeds 850° F., the thermostat will increase the flow of water to the boiler, subsequently reducing steam temperature to 850° F. If the steam temperature falls below 850° F. in the line 23, the thermostat decreases the flow of water from pump 74 to the boiler 73, thereby raising the steam temperature to 850° F. Condensate is transmitted from the condenser via a water supply tank 76 to pump 74. Accordingly, the boiler 73 is never allowed to overheat or to run dry. Also, the temperature of the steam is maintained at a sufficiently high value to insure good turbine efficiency.

An expansible diaphragm 91, connected to the condenser end bell 51 by a pipe 92, acts on a rod 93 in series with the steam thermostat 75 to modify the temperature control of the feed pump 74 upon an increase in the vapor pressure in the condenser outlet. The effect of this superimposed vapor control is to increase the stabilized steam temperature with an increase in condenser pressure such as might be encountered in hot weather at low altitude when heat can not be readily dissipated by wings. The aforesaid increase of steam temperature over 850° F., and up to 1050° F. for example, decreases the number of heat units abstracted from engine exhaust gases under such conditions, when little supercharging is required when no wing deicing is required. Yet the boiler metal is not harmed by reaching such temperature, which is substantially less than that of the exhaust gases. This provision reduces the required size of the condensing system from the standpoint of heat dissipation when the outside air temperature is high.

The supercharging unit is generally cylindrical in shape measuring about 1 ft. diameter and about 6 ft. long in a representative case. In unit B is housed the air compression mechanism and a condenser or heat transfer surface C is provided to dissipate rejected heat from the drive turbine A between units B and C.

This rejected heat flows continuously and is transmitted to a wing leading edge D by means of a non-freezable liquid circulation system. The velocity of circulation is maintained high to insure positive thermal deicing in the wing surface. The provision of high velocity by means of liquid circulation, above, avoids deleterious back pressure of the steam being discharged from the turbine, thereby contributing to cycle efficiency of the turbine. No danger exists from condensate of steam freezing in contact with wing surfaces as a result of progressive stagnation and flow unbalance.

The circulated liquid may be a eutectic mixture of ethylene glycol and water, for example, which has a freezing point far lower than that of water.

In connection with a steam generation system producing 3,000,000 B. t. u. per hour of steam heat from the engine exhaust heat, approximately 320 brake horsepower will be made available for air compression in the supercharging unit B, in which case about 2,300,000 B. t. u. per hour is dissipated from the condenser unit C as rejected heat to the glycol water mixture. This is enough power to supercharge a 2,500 horsepower engine at 25,000 ft. altitude, to full rated power, and sufficient deicing heat is made available to prevent formation of ice on a wing area commensurate with an engine of 2,500 horsepower output.

The wing leading edge 80 preferably comprises a skin 81 resistance welded to underlying corrugated sheet 82 in a fore and aft direction. A spanwise upper header 83 and a lower header 84 communicate with the ends of the spaces between the skin 81 and the sheet 82.

A propeller pump 85 driven by an electric motor 86 forces glycol-water mixture into an inlet 52 in the condenser unit C. This mixture issues from the unit C from an outlet 54, at a temperature of about 200° F., and is piped to the header 83. After circulation through the wing interspaces the mixture is collected in header 84 and conducted to pump 85 at about 160° F.

A thermostat 87 in the glycol-water system, preferably adjacent to the outlet 54, regulates the speed of motor 86 to maintain a constant glycol temperature. If the glycol temperature at the outlet 54 tends to exceed 200° F., the speed of the motor is brought to a maximum. If the glycol temperature falls below 200° F. the speed of the motor is allowed to decrease. The result is that the more important upper leading edge is maintained close to 200° F. regardless of weather conditions. The temperature of the lower leading edge varies to some extent, and this variation insures proper adjustment of heat rejection with regard to weather conditions.

When heat is so provided to the leading edge, the boundary layer of the entire wing to the rear is warmed preventing ice formation on the rest of the wing. It is still essential to conduct some heat to wing tips, empennage and aileron hinges, hence a vertical sheet 88 is extended from header 83 to header 84 to form a duct with the rest of the leading edge. An air inlet 90 induces flow into this duct, spanwise to abstract heat from sheet 82, and is then piped to the aforementioned surfaces to be deiced.

Since there is always some danger of engine failure or of the steam system developing a serious leak which may disable it, an emergency gasolene burner 89, preferably of the surface combustion type, is located at the outlet 54 in thermal contact with the glycol water mixture. This provides a strictly emergency means of deicing, since the only unit which is required to operate is the motor and pump circulating the mixture.

In Figure II, illustrating the supercharging unit B, a directly driven axial blower rotor 1 is supported by bearings within the outer casing 3, by an inlet spider 4 and an outlet spider 5. The aforesaid spiders serve not only as supports but also as countervanes 7 to improve efficiency of airfoil rotating vanes 6. A freewheeling rotor 2 is mounted on hub 8 at the rear of rotor 2, and engaged thereto at certain times by a hydraulic coupling 9 to be described later.

As illustrated in Figures II and III the discharge air from the blower passes axially around a streamlined cone 10 to a rectangular bend provided with turning vanes 11 to permit the air to leave the unit with minimum flow losses. The cone 10 converges into a shaft tunnel 12 passing axially across the bend to a turbine nozzle case 13. A turbine wheel 14 is borne by a bearing 15 and connected to a shaft 16 for driving planetary sun gear 17 inside hub of outlet spider 5. The rotor hub 8 bears a ring gear 18 engaging planet pinions 19. In a representative case the turbine wheel 14 rotates at a maximum speed of 46,000 R. P. M. and the planetary reduction provided, through gears 17, 18 and pinion 19 cause rotation of rotor 1 at a maximum speed of 16,500 R. P. M. Thereby efficient operating pitch line velocity is provided for the multi-stage axial flow blower, and for the single stage turbine, each operating at its optimum speed.

In Figure II, the details of the control mechanism for the supercharger B are displayed. A sealed aneroid 20 exposed to blower discharge pressure, to maintain a constant discharge air absolute pressure, regardless of airplane altitude or engine speed, adjusts a fly ball turbine governor 21 driven from the ring gear 18. A pressure tap 24 in the supercharger discharge conduit 59 leads to a dashpot chamber 60 interposed between the governor 21 and the throttle valve 22, and also communicates with the housing of the aneroid 20, a dashpot piston 61 having its other side connected to a vent line 62 controlled by a bleed valve 63 operated by the aneroid 20. If the boost pressure is deficient, the aneroid expands, opening valve 63, the resulting downward movement of piston 61 setting the governor to a higher value of equilibrium rotative speed, whereupon the governor opens a throttle valve 22 admitting a greater flow of working vapor (steam, for instance) from a steam supply line 23 to the turbine nozzle ring 13. The speed of the turbine and of the blower is thereby raised until the air boost is restored to normal value. The base setting of the aneroid 20 may be manually adjusted by handle 68 to vary the manifold pressure, a scale 69 being calibrated in inches of mercury. In order to limit the steam pressure, when the throttle 22 restricts the flow of steam to the turbine, a bypass valve 66 and conduit 67 is provided between the steam line 23 and the exhaust side of the turbine, the bypass valve being spring loaded to the desired operating pressure.

The interposition of the governor control between the aneroid control and throttle valve is advantageous to avoid hunting in the system boost control. Without the speed governor the effect of storage of compressed air of elastic properties, at the blower discharge, permits the turbine to overspeed and underspeed in rapid fluctuations due to the lag in air pressure effect upon the aneroid. However, the presence of the governor completely eliminates difficulty from elastic air effects and provides uniform air pressure to the engine being supercharged.

It is apparent that rotor 1 operates at a constant speed ratio with respect to turbine wheel 14. At maximum altitude of the air craft and at maximum rotative speed of the engine being supercharged, rotor 1 operates at 16,500 R. P. M. and at 31 inches of mercury absolute discharge air pressure, for example. If the engine speed is now reduced by increasing propeller pitch and by leaning the fuel air ratio, the blower characteristic will not be sufficiently broad to permit the consequent decrease in air flow, without unstable operation.

Therefore, a control is provided to progressively engage rotor 2 to hub 8 in the amount required to provide an excess compression through the supercharger as a whole, which will result in lowering of the speed of the turbine A due to action of the aneroid 20 as previously described. Then at the lower speed the blower produces the required compression ratio at the reduced air flow without departing from a stable range of operation at high efficiency. With this arrangement an efficiency of compression not less than 85% based on adiabatic cycle, can be obtained from 100% rated air flow down to 40% rated air flow.

Figure IV illustrates diagrammatically the control for the speed of rotor 2. An air piston 25 within a cylinder 26 of the spider 4 is exposed on the front side to a pressure tap 27 lying opposite a large diameter portion of the hub of the spider 4 where the air velocity is relatively high, and on the rear side to the apex of the hub of the spider 4 to a pressure tap 28. It is apparent that the piston 25 has air differential pressure acting upon it, tending to compress a spring 29, and to open a needle valve 30, to an extent dependent upon the rate of air flow into the blower inlet, in accordance with the well known Bernoulli's theorem. Thus an increase in air flow tends to open valve 30, and a decrease in flow to close valve 30. The degree of bleeding of oil from the valve 30 as a result of control of position by piston 25 regulates the degree of engagement of coupling 9.

Referring now to Figures IV and V showing the construction of the coupling, rotor 2 is fixed to the open faced toroidal channels of the hydraulic couplings 9 provided with transverse radial vanes 31. Between the open faces of the channels is a coaxial yoke member 32 journaled on hub 8 bearing a plurality of variable angle impeller vanes 33 protruding into the channels 31. The channels are filled with oil so that relative motion of the vanes 33 about the blower axis will transmit torque by induced circulatory flow in the oil channels, transversely of these channels from the vanes 33 to the rotor 2. A gear 34 fixed to hub 8 engages gear teeth 35 on the journals of vanes 33. Rotation of hub 8 accordingly tends to twist vanes 33 about their journal's axis against a stop 37 in a direction to feather the vanes in the fluid lying with the channels 31. In feathered position the vanes 33 are substantially incapable of transmitting torque from hub 8 to rotor 2. Hence rotor 2 free-wheels primarily under the influence of air flow through its air vanes 6 as a result of induced air flow from rotor 1 as shown in Figure V.

However, between gear 34 and yoke member 32 is a plunger 38 and a cylinder 39 tending to alter the rotative phase relationship thereof about the blower axis, when pumped full of oil, whereby engagement of gear 34 with teeth 35 tend to unfeather vanes 33 as shown in Figure V, transmitting maximum torque from hub 8 to rotor 2.

A continuous pressure oil supply is led into cylinder 39 from a bleeder line 39a dependent upon a source to be described. The pressure of oil at the source is reduced by opening of valve 30, or increased by closure of valve 30.

When substantially no oil pressure is present in plunger cylinder 39, the entire reaction of drag of paddles 33 is taken on the teeth of the paddle pinions 35 inasmuch as the yoke is not caused to press on the shoulders of the pinions.

The former reaction tends to roll the paddles into a fully feathered position as shown at E in Figure V.

Now assuming an intermediate pressure to be built up hydraulically in the cylinder 39, the paddle pinions will receive a reaction from the yoke 32 so that the paddles unfeather and assume an intermediate angular position.

At maximum hydraulic pressure in the cylinder 39, all the driving torque is transmitted from the gear to the yoke 32, and thence to the paddles 33, and in fact a negative reaction is brought to bear between the gear 38 and the pinions 35 which forces the paddles into radial (unfeathered) position as shown at F.

It is apparent that the effective driving angle of the paddles is a function of oil pressure in the cylinder 39. The greater the oil pressure in this cylinder, the greater the drive torque transmitted through the coupling.

Representative control oil pressure at position E of the paddles may be 5 lbs. per square inch, which is sufficient pressure to properly circulate oil to the planetary gear-set and to the turbine bearing. As the needle 30 closes down the oil bleed at its seat the control oil pressure may mount to 300 lbs. per square inch, for example, inasmuch as the oil passages leading to the planetary gear set and to the turbine bearing constitute an appreciable restriction to oil flow.

Oil flooding adjacent to the turbine bearing 15 and planetary gear-set is avoided by leakage from the blower discharge to the interior of the tunnel 12, which tends to displace excess oil and to return it to the tank 40. The air is then vented from the top of the filler passage 65 to the atmosphere.

In consequence of the described relationships it is apparent that an increase of air flow through the blower will cause a decrease of speed of rotor 2 with respect to rotor 1, and vice versa a decrease of air flow through the blower will cause an approach of speed of rotor 2 to that of rotor 1.

Referring to Figure IV an oil tank 40 shaped as an oblate spheroid is located within rotor 1. At the front end tank 40 is supported from spider 4 by a torque tube 41; and at the rear end tank 40 is journalled from hub 8. An oil pump casing 42 is attached to the rear end of tank 40, having an oil inlet 43 submerged in the tank oil supply. A pumping gear-set or centrifugal oil impeller is rotated within casing 42 by an extension 44 of shaft 16. The oil pump delivers oil to the bleeder line to valve 30 and to lubricating line 45 in shaft 16 for lubrication of the turbine bearing and planetary gear-set.

The oil tank 40 within rotor 1 occupies an otherwise wasted space, and permits the oil system to be fully enclosed in the supercharging unit avoiding the danger of external lines which may be broken. The oil is cooled by forced convection currents between the rotor 1 and the tank. The oil is so located that the lubrication system is always assured of positive priming when the airplane is operating at steep angle or in rough air.

The provision of variable angle vanes 33 in coupling 9 insures higher transmission efficiency than that of conventional hydraulic couplings. The vanes are preferably constructed of high speed foil shape, as in airplane wing sections. The vanes come to equilibrium at an angle somewhere between feathered angle and radial angle when the rotor 2 is being regulated at a speed less than that of rotor 1. At such time the power transmission efficiency remains substantially as high as when the vanes are in fully unfeathered (in radial) position. Another reason for using this type of construction in the coupling is that response to demand for change of relative speed between rotors 1 and 2 is almost instantaneous, contributing to accuracy of the control, yet the control is stable and does not overshoot. Conventional "scoop tube" couplings on the other hand involve considerable lag due to necessity for filling or emptying the coupling with oil to obtain control, and an intermediate control position work on the principle of decrease of efficiency by permitting wasteful turbulent slip, to control speed, and are therefore not suitable for incorporation in a blower drive of the described type.

The steam issuing from the turbine wheel 14 has a comparatively high residual velocity which is diffused between a divergent cone 46 and a convergent cone 47 coaxial with the wheel at the discharge side thereof. The diffusion of the steam insures the operation of the turbine wheel at a static pressure appreciably less than that entering a condenser core 48, therefore the nozzle ring spouting velocity is increased due to the greater expansion ratio provided and the windage losses of the wheel are lessened due to rotation in ambient fluid of lowered density, both of which factors improve turbine efficiency and power output.

The condenser core 48 consists of a bundle of small tubes 49 located in an axial direction by end tube sheets 50. The steam flows axially through the tubes 49 and is collected as condensate in end bell 51. The eutectic mixture is generally counter-flow to that of the steam although transverse baffles 55 located at axial intervals of space extend across the tube bundle part of the way insure a positive scrubbing action to promote high rate of heat transmission by causing the glycol and water to zig-zag across the tubes 49.

The foregoing described supercharging system is especially designed to maintain a constant manifold pressure in the power plant for both maximum power and for cruising at a lower engine R. P. M. Since the optimum efficiency of a conventional axial flow compressor can not be had at both extremes of such a range of requirements, the floating stages of my axial flow compressor provide the necessary variation in capacity, and the control thereof is interrelated to the turbine and condenser coolant controls to provide a completely self contained and automatically controlled steam driven auxiliary unit capable of recovering the equivalent of over 13% of the rated power of the main engine while relieving the engine of an equivalent load. Under cruising conditions the power recovery may rise to 16% of the cruising power due to the maintainance of manifold pressure as a result of the second stage compressor coming into action at a reduced turbine speed and volume of air flow.

Having thus described my invention and the present preferred embodiments thereof, I desire to emphasize the fact that many modifications may be resorted to in a manner limited only by a just interpretation of the following claims.

I claim:

1. An airplane supercharging unit consisting of an axial flow blower having a hollow rotor, a drive shaft coaxial with said rotor, and a hydraulic coupling between said shaft and said rotor and within said hollow rotor for connecting said rotor and said shaft.

2. An airplane supercharging unit consisting of an axial flow blower having a rotor split in two aligned and independently rotatable sections, and a slip coupling therebetween adapted to support one of said sections and to permit a differential rate of rotation between said sections.

3. An airplane supercharging unit consisting of an axial flow blower having a rotor split in two juxtaposed independently rotatable sections, a drive shaft connected directly to one of said sections and a variable speed coupling within and connecting the second of said sections to said shaft.

4. Apparatus as defined in claim 3 and means responsive to air quantity passing through said blower for regulating said coupling.

5. A supercharging unit including a drive turbine, an axial flow blower having a split rotor consisting of a first section driven at constant speed ratio with respect to said turbine, and a second section, a variable speed coupling connecting said second section to said turbine, said blower having a streamlined entry nose adjacent to the inlet thereof, a first air pressure tap adjacent to the apex of said nose, and a second air pressure tap at the larger diameter portion of said nose, a movable member connected on one side to pressure in said first tap and on the opposite side to pressure in said second tap, and means associated with said member is so constructed and arranged as to vary the speed ratio of said coupling.

6. A supercharging unit composed of a turbine, an axial flow blower having a hollow rotor, lubricated mechanism for the driving of said rotor from said turbine, a stationary spider adjacent to an end of said rotor for supporting said rotor, an oil supply tank lying inside said rotor and fixed to said spider at one end, a pump casing fixed to said tank, a pump impeller in said casing, a pump shaft connecting said impeller to said rotor, a conduit extending from the impeller's discharge to said mechanism, and an oil filler supply connection extending from the impeller's inlet to said tank.

7. A supercharging unit including a drive turbine, an axial flow blower having a split rotor consisting of a first section driven at constant speed ratio with respect to said turbine, and a second section, a variable speed coupling connecting said second section to said turbine, and regulating means for said unit comprising a constant blower discharge pressure control for said turbine, and means responsive to variations in the volume of flow through said blower adapted to vary the speed ratio of the coupling for said second section whereby to broaden the stable range of operation of said supercharging unit.

8. A supercharging unit composed of a turbine, an axial flow blower having a hollow rotor, a variable speed hydraulic drive within said rotor and connected between said turbine and said rotor, a variable pressure hydraulic system connected to said hydraulic drive for varying the speed ratio thereof, and means controlling said variable pressure hydraulic system in response to changes in the volume of flow through said blower.

NATHAN C. PRICE.